United States Patent Office 3,201,437
Patented Aug. 17, 1965

3,201,437
NEOALKYL PHOSPHITES
Lester Friedman, Beachwood, Ohio, assignor, by mesne assignments, to Union Carbide Corporation, a corporation of New York
No Drawing. Filed June 11, 1962, Ser. No. 201,249
8 Claims. (Cl. 260—461)

The present invention relates to novel phosphorus containing compounds.

Esters of alcohols containing hydrogen atoms on the carbon beta to the alcohol group suffer from varying degrees of thermal instability.

Dialkyl phosphites have been proposed in the past as scavengers and stabilizers in polymer systems. Their use has been limited by their temperature stability limit.

It is an object of the present invention to prepare novel phosphites.

Another object of the invention is to improve the heat and oxidative stability of polymer systems.

It has now been found that these objects can be attained by preparing neoalkyl containing phosphites having one of the following formulae (1) 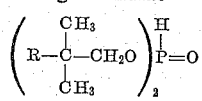

(2) 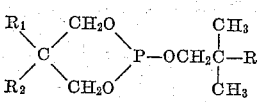

and (3) 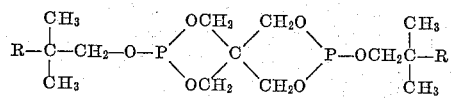

where R is an alkyl group having 1 to 15 or more carbon atoms, e.g. methyl, ethyl, propyl, butyl, hexyl, octyl, decyl, dodecyl, pentadecyl and $R_1$ and $R_2$ are alkyl groups, preferably lower alkyl groups, e.g. methyl, ethyl, propyl, butyl, hexyl.

Compounds having Formula 1 are useful as stabilizers for polymers such as natural rubber, synthetic rubbers, e.g. butadiene-styrene copolymer (e.g. 75:25 ratio), butadiene-acrylonitrile copolymer (e.g. 80:20 ratio), butadiene-vinyl pyridine copolymer, isobutylene-isoprene copolymer (e.g. 97:3 ratio), linear polyesters, e.g. polyethylene terephthalate (Mylar) and other polyesters as disclosed in Whinfield Patent 2,465,319, polyamides of the nylon type, e.g. polymeric hexamethylene adipamide and other polyamides as shown in Carothers Patent 2,071,250 as well as caprolactam polymer, polyolefins such as polyethylene, polybutylene and especially polypropylene and copolymers of ethylene and propylene (e.g. a 50:50 copolymer) and as antioxidants in lubricating oils. The bis-neoalkyl hydrogen phosphites of Formula 1 are used in an amount of 0.1% to 10% by weight of the polymer or lube oil being stabilized.

Compounds having Formulae 2 and 3 are also useful for stabilizing the same polymers as are the compounds of Formula 1 and are also useful as stabilizers for halogen containing vinyl polymers, e.g. polyvinyl chloride, vinyl chloride-vinyl acetate copolymer (87:13 ratio), vinyl chloride-acrylonitrile copolymer (85:15 ratio) vinylidene chloride-vinyl chloride copolymer (85:15 ratio) and vinylidene chloride-acrylonitrile copolymer (80:20 ratio).

The neoalkyl heterocyclic phosphites of Formulae 2 and 3 are used in an amount of 0.1% to 10% by weight of the polymer being stabilized.

As examples of compounds within Formula 1 there can be prepared and used in accordance with the invention bis neopentyl hydrogen phosphite, bis-neohexyl hydrogen phosphite, bis neooctyl hydrogen phosphite, bis-neodecyl hydrogen phosphite, bis-neododecyl hydrogen phosphite, bis-neotetradecyl hydrogen phosphite, bis-neooctadecyl hydrogen phosphite, bis-neoundecyl hydrogen phosphite, neodecyl neododecyl hydrogen phosphite.

Examples of compounds within Formula 2 which can be prepared and used in accordance with the invention include neopentyl neopentylene phosphite, neohexyl neopentylene phosphite, neooctyl neopentylene phosphite, neodecyl neopentylene phosphite, neododecyl neopentylene phosphite, neotetradecyl neopentylene phosphite, neooctadecyl neopentylene phosphite, neononyl neopentylene phosphite, neodecyl neohexylene phosphite, 2-neodecoxy-5,5-diethyl-1,3,2-dioxaphosphorinane, 2-neooctoxy-5-propyl-5-butyl-1,3,2-dioxaphosphorinane.

Examples of compounds within Formula 3 which can be prepared and used in accordance with the invention include bis-neopentyl pentaerythritol diphosphite, bis-neohexyl pentaerythritol diphosphite, bis-neooctyl pentaerythritol diphosphite, bis-neodecyl pentaerythritol diphosphite, bis-neododecyl pentaerythritol diphosphite, bis-neotetradecyl pentaerythritol diphosphite, bisneohexadecyl pentaerythritol diphosphite, bis-neooctadecyl pentaerythritol diphosphite, neooctyl neodecyl pentaerythritol diphosphite.

Unless otherwise indicated all parts and percentages are by weight.

Compounds within Formula 1 can be prepared by reacting 2 moles of a neoalkanol with 1 mole of a dialkyl or diaryl phosphite to liberate an alcohol or phenol which preferably has a lower boiling point than the neoalkanol. Thus there can be used dimethyl phosphite, diethyl phosphite, dipropyl phosphite, dibutyl phosphite, di sec. butyl phosphite, dihexyl phosphite, di decyl phosphite, diphenyl phosphite and dicresyl phosphite.

Alternatively the bis-neoalkyl phosphite can be prepared by reacting two moles of the neoalkanol with 1 mole of $PCl_3$ merely by heating the two materials together at a temperature up to reflux. The bis-neoalkyl phosphorus chloride formed,

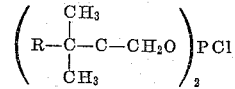

is decomposed by heating with 1 mole of water to obtain the desired bis-neoalkyl hydrogen phosphite.

Another method of preparing the compounds of Formula 1 is to heat 2 moles of the neoalkanol with 1 mole of triphenyl phosphite or other triaryl phosphite or trihaloaryl phosphite, e.g. tri p-cresyl phosphite and tri o-chlorophenyl phosphite, distill off the phenol formed and then hydrolyze the bis neoalkyl aryl phosphite, e.g. with aqueous hydrochloric acid and remove the water present and the phenol formed by distillation to process the bis neoalkyl hydrogen phosphite.

The compounds with Formula 2 can be prepared by heating a mixture of (a) 1 mole of a neoalkanol, (b) 1 mole of a neoalkanediol having one carbon atom between the carbon atoms attached to the hydroxyl groups, and (c) 1 mole of a triaryl or haloaryl phosphite or trialkyl phosphite. The reaction is completed by heating the mixture, preferably in vacuo, to remove the phenol or alkanol formed. Preferably the alkanol should be one boiling below the neoalkanediol. The reaction is preferably catalyzed with 0.05–5% of a diaryl phosphite or dialkyl phosphite, e.g. diphenyl phosphite, d-o-cresyl phosphite, di-p-cresyl phosphite, dimethyl phosphite, bisneopentyl phosphite or dibutyl phosphite. Alternatively an alkaline catalyst can be used, e.g. 0.05–5% of sodium phenolate, sodium cresylatex potassium phenolate, sodium methylate, sodium neopentylate, bis sodium neopentylene glycolate. When alkaline catalysts are employed preferably they have a pH of at least 11 in a 0.1 N solution.

An alternative method for forming the compounds of Formula 2 is to react 1 mole of an aryl neoalkylene phosphite wherein the neoalkylene group is that of a 1.3 glycol with 1 mole of a neoalkanol in the presence of 0.05–5% of the diaryl phosphite or dialkyl phosphite or alkaline catalysts set forth above. In place of the aryl neoalkylene phosphite there can be used one alkyl neoalkylene phosphite provided the alkanol corresponding to the alkyl group boils lower than the neoalkanol employed.

In order to make the compounds of Formula 3 there are reacted by heating 2 moles of a neoalkanol with 1 mole of pentaerythritol and 2 moles of a triaryl phosphite or trihaloaryl phosphite or a trialkyl phosphite of an alkanol which boils lower than the neoalkanol employed in the presence of 0.05–5% of the diaryl phosphites or dialkyl phosphite or alkaline catalysts set forth above. The phenol or alkanol formed is removed by distillation.

An alternative method of preparing the compounds of Formula 3 utilizing the same catalysts as those just specified is to react 1 mole of a diaryl pentaerythritol diphosphite or 1 mole of a dialkyl pentaerythritol diphosphite with 2 moles of a neoalkanol and removing the phenol or alkanol formed by distillation. The alkanol should boil below the boiling point of the neoalkanol.

In preparing the compounds of the present invention the neoalkanols referred to above include neopentanol neohexanol, neoheptanol, neooctanol, neodecanol, neododecanol, neotetradecanol, neohexadecanol and neooctadecanol. Many of these neoalkanols can be prepared by the telemerization of isobutyl alcohol with 1 or more moles of ethylene. Thus the telemer with 1 mole of ethylene is neohexanol and the telemer with 3 moles of ethylene per mole of isobutyl alcohol is neodecanol.

As the neoalkanediol there can be used any 2,2-dialkyl-1,3-alkanediol such as neopentylene glycol, neohexylene glycol (2-methyl-2-ethyl-1,3-propanediol), 2,2-diethyl-1,3-propanediol, 2-methyl-4-butyl-1,3-propanediol; 2-propyl-2-butyl-1,3-propanediol.

As the triaryl or trihaloaryl or trialkyl phosphite there can be used triphenyl phosphite, tri o-cresyl phosphite, tri-m-cresyl phosphite, tri-p-cresyl phosphite, tri-xylenyl phosphite, tris decyl phosphite, trimethyl phosphite, tributyl phosphite, triethyl phosphite, diphenyl butyl phosphite.

Example 1

158 grams (1 mole) of neodecanol (1 mole) and 97 grams (0.5 mole) of dibutyl phosphite were heated together at 100° C. in a vacuum (10–15 mm.). The n-butanol was removed as rapidly as it formed. Towards the end of the reaction the temperature of the mixture was raised to 140° C. to help remove residual n-butanol. The liquid residue was essentially pure di-neodecyl hydrogen phosphite (bis-neodecyl hydrogen phosphite).

Example 2

The procedure of Example 1 was repeated using 1 mole of neopentyl alcohol and 0.5 mole of dipropyl phosphite as the reactants to recover di-neopentyl hydrogen phosphite as the liquid residue.

Example 3

The procedure of Example 1 was repeated using 1 mole of neododecanol and 0.5 mole of diphenyl phosphite to recover di-neododecyl hydrogen phosphite as the liquid residue.

Example 4

158 grams (1 mole) of neodecanol, 104 grams (1 mole) of neopentylene glycol and 310 grams (1 mole) of triphenyl phosphite were heated in the presence of 2.0 grams of diphenyl phosphite as a catalyst in a vacuum, 10–15 mm., at 120–140° C. The phenol formed was removed by distillation through a short fractionating column. The reaction was brought to completion by raising the pot temperature to 175–180° C. and passing a nitrogen stream through the mixture while maintaining an internal pressure at 10–15 mm. to remove all the phenol. After completion of the reaction there remained in essentially quantitive yield neodecyl neopentylene phosphite as a liquid.

Example 5

The procedure of Example 4 was repeated replacing the neodecanol by 1 mole of neododecanol to form neododecyl neopentylene phosphite as the liquid residue.

Example 6

The procedure of Example 4 was repeated replacing the neodecanol by 1 mole neopentyl alcohol and replacing the triphenyl phosphite by 1 mole tripropyl phosphite to form neopentyl neopentylene phosphite, as the liquid residue.

Example 7

The procedure of Example 4 was repeated replacing the neopentylene glycol by 1 mole of 2-methyl-2-ethyl-1,3-propanediol to form neodecyl neohexylene phosphite.

Example 8

The compound of Example 4 was formed in an alternate procedure by heating 1 mole of phenyl neopentylene phosphite with 1 mole of neodecanol in the presence of 2 grams of diphenyl phosphite at 120–140° C. in vacuo (10–15 mm.) and removing the phenol formed by distillation. The residue was neodecyl neopentylene phosphite.

Example 9

430 grams (2.34 moles, i.e. a slight excess) of neododecanol, 204 grams (1.15 moles) of pentaerythritol and 712 grams (2.3 moles) of triphenyl phosphite in the presence of 2.0 grams of diphenyl phosphite as a catalyst were heated in vacuo (10–15 mm.) at 120–140° C. The phenol formed was removed by distillation through a short fractionating column. The reaction was brought to completion by raising the pot temperature to 175–180° C. and passing a nitrogen stream through the mixture, maintaining the internal pressure at 10–15 mm. to remove all the phenol and the slight excess of neododecanol used. The clear colorless liquid residue was essentially pure bis-neodedecyl pentaerythritol diphosphite, yield 685 grams.

Example 10

The procedure of Example 9 was repeated replacing the neododecanol by 2.34 moles of neooctanol to form bis-neooctyl pentaerythritol diphosphite as the liquid residue.

Example 11

The procedure of Example 9 was repeated replacing the neododecanol by 2.34 moles of neodecanol to form bis-neodecyl pentaerythritol diphosphite as the liquid residue.

Example 12

The procedure of Example 9 was repeated replacing the neododecanol by 2.34 moles of neopentyl alcohol and replacing the triphenyl phosphite by 2.3 moles of triethyl phosphite to form bis-neopentyl pentaerythritol diphosphite as the liquid residue.

Example 13

The compound of Example 9 was formed in an alternate procedure by heating 1 mole of diphenyl pentaerythritol diphosphite with 2 mols of neododecanol in the presence of 2 grams of diphenyl phosphite at 120–140° C. in vacuo and removing the phenol formed by distillation. The residue was bis-neododecyl pentaerythritol diphosphite.

Example 14

100 grams of solid polypropylene was stabilized by adding 2 grams of bis-neodecyl hydrogen phosphite thereto.

Example 15

100 grams of solid polypropylene (melt index at 190° C. of 0.8) was stabilized by adding 2 grams of neodecyl neopentylene phosphite thereto.

Example 16

100 grams of solid polypropylene (melt index at 190° C. of 0.8) was stabilized by adding 2 grams of bis-neododecyl pentaerythritol diphosphite thereto.

Example 17

A formulation was made from 100 parts of polyvinyl chloride, 60 parts of dioctyl phthalate, 2 parts of barium-cadmium laurate.

To separte portions of this formulation there were added 2 parts per 100 parts of polyvinyl chloride of the following compounds (a) Neodecyl neopentylene phosphite
(b) Bis-neododecyl pentaerythritol diphosphite Improved stability of the polyvinyl chloride was noted by both the addition of compound (a) and compound (b).

Example 18

The stability of butadiene-styrene (75:25) rubbery copolymer was improved by adding 5 parts of bis-neodecyl hydrogen phosphite to 100 parts of the copolymer.

Conventional rubber additives of course can be added and the bis-neodecyl hydrogen phosphite can be added to a latex of the copolymer. The bis-neodecyl hydrogen phosphite also was useful in stabilizing natural rubber.

I claim:
1. A compound having one of the formulae

(a) 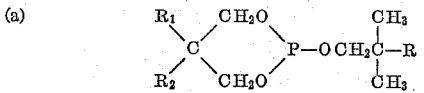

and (b) 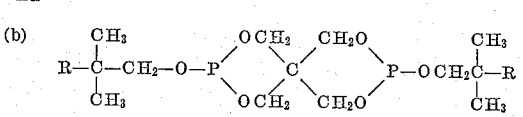

where R, $R_1$ and $R_2$ are alkyl groups.

2. 2-neoalkoxy-5,5-diloweralkyl 1,3,2-dioxaphosphorinanes.

3. Compounds according to claim 2 wherein the neoalkoxy group has 5 to 12 carbon atoms.

4. Neoalkyl neopentylene phosphites wherein the neoalkyl group has 5 to 12 carbon atoms.

5. Bis-neoalkyl pentaerythritol diphosphites.

6. Compounds according to claim 2 wherein the neoalkyl groups each have 5 to 12 carbon atoms.

7. Bis-neododecyl pentaerythritol diphosphite.

8. Neodecyl neopentylene phosphite.

References Cited by the Examiner

UNITED STATES PATENTS

| | | | |
|---|---|---|---|
| 2,847,443 | 8/58 | Hechenbleikner | 260—461 |
| 2,892,862 | 6/59 | Lanham | 260—461 |
| 2,952,699 | 9/60 | Norman | 260—461 |
| 2,961,454 | 11/60 | Gould et al. | 260—461 |
| 3,039,993 | 6/62 | Friedman | 260—461 |
| 3,047,608 | 7/62 | Friedman et al. | 260—461 |
| 3,054,821 | 9/62 | Rolih et al. | 260—461 |
| 3,055,861 | 9/62 | Hersh et al. | 260—461 |
| 3,058,941 | 10/62 | Birum | 260—30.6 |
| 3,061,571 | 10/62 | Updegraff et al. | 260—30.6 |

OTHER REFERENCES

Bellamy et al.: J. Chem. Soc. (1952), pp. 475–483.
Bellamy et al.: J. Chem. Soc. (1952), pp. 1701–1706.
Gerrard et al.: J. Chem. Soc. (1950), pp. 2088–2092.

CHARLES B. PARKER, *Primary Examiner*.
MORRIS LIEBMAN, *Examiner*.